W. FORGER.
DRY CLEANING EXTRACTOR.
APPLICATION FILED JAN. 15, 1919.

1,307,661.

Patented June 24, 1919.

INVENTOR
William Forger
BY
ATTORNEY

UNITED STATES PATENT OFFICE.

WILLIAM FORGER, OF NEW YORK, N. Y.

DRY-CLEANING EXTRACTOR.

1,307,661.   Specification of Letters Patent.   Patented June 24, 1919.

Application filed January 15, 1919. Serial No. 271,276.

*To all whom it may concern:*

Be it known that I, WILLIAM FORGER, a citizen of the United States of America, residing at New York, N. Y., have invented a new and useful Dry-Cleaning Extractor, of which the following is a specification.

My invention relates to improvements in an apparatus for cleaning fabrics and the like by the use of gasolene.

It has been customary to clean fabrics with gasolene and remove the gasolene, or most of it, from the fabric in a machine commonly termed an extractor. This machine consists of a stationary shell and an inner drum rotated at high speed so as to throw off the gasolene by centrifugal action. The use of such machines has been always said to be very dangerous owing to frequent fires and explosions which take place in the vicinity. It has generally been said that these fires were due to spontaneous combustion. I have discovered that they are due to the action of electricity evolved in the operation of the machine and I have further discovered a means for preventing it.

Figure 1:
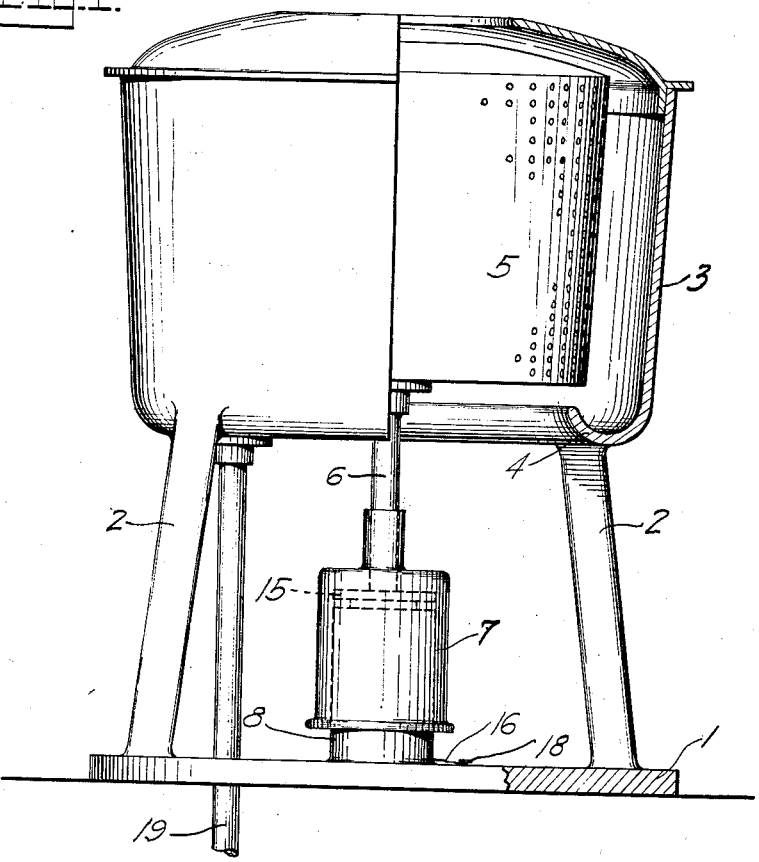
Figure 1, is a side view and partial section of a machine embodying the improvements of my invention.
Figure 2:
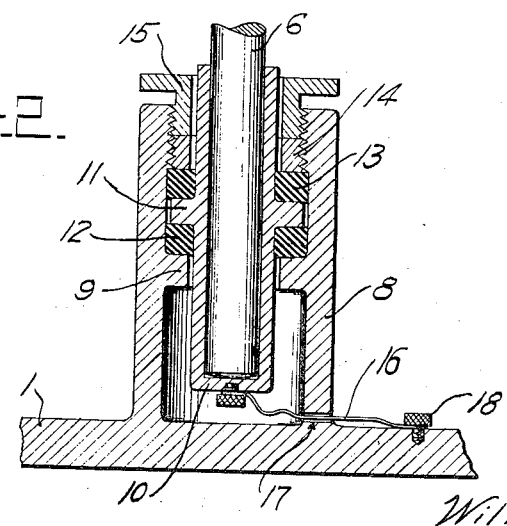
Fig. 2, is an enlarged partial sectional view showing the support for the rotating member and the electrical connections.

The base 1 is usually of cast iron and provided with some suitable form of standard 2 for supporting the outer shell 3. The trough 4, is usually provided for collecting the gasolene and carrying it off to a suitable storage.

The drum 5 has its sides perforated to allow the gasolene to fly outwardly. The shaft 6 is provided with a pulley 7 for rotating the drum.

The base has an up-standing hub 8 provided with an interior flange 9. The shaft is mounted to rotate in a sleeve 10 of bronze or other suitable metal. This sleeve is provided with an external flange 11. A rubber washer 12 is interposed between the two flanges so as to support the weight of the rotating member. Another rubber washer 13, is mounted above the flange of the sleeve and clamped down in place by one or more rings such as 14 and 15. The relative dimensions of the parts are such that the shaft and drum may be rotated freely and may tilt somewhat without bringing the sleeve or shaft into contact with the supporting hub. The tension of the rubber washers may be adjusted by means of the rings 14 and 15.

When the drum is rotated at high speed there is a tendency for electricity to be generated and stored in the drum. This I avoid by electrically connecting the sleeve with the base by a connection 16 which is preferably flexible so as to not interfere with the tilting or vibration of the shaft and so as to avoid the possibility of breaking under repeated vibrations. This connection may be made of woven or multiple strand wire or of chain. The end of the connection 16 may be passed through an opening 17 and secured to the base at 18 for convenience if desired. The connection should be positive however so as to avoid any accidental interruption of the electrical connection. It is also desirable to ground the machine so as to avoid the collection or storage of any charge of electricity in the outer casing or shell. This grounding may conveniently be effected through the medium of the pipe 19 through which the gasolene is drawn off. By this arrangement both the stationary and rotating elements of the machine are grounded and there is no possibility of a charge of electricity being collected or stored in either part at any time. There is therefore no possibility of a spark being drawn from either part to the operator or to the fabric which he is handling, or being drawn from one part of the machine to the other part by the operator or by the fabric being treated.

There is therefore no danger of fire from the ordinary use of these machines.

I claim:—

1. In a dry cleaning machine, a stationary casing, an extracting drum mounted to rotate inside the casing and out of contact therewith at all points, means for supporting said drum including yielding insulating members and means for conductively and flexibly connecting said drum and casing for the purpose specified.

2. In a dry cleaning apparatus, a stationary casing and base, an upstanding hollow boss on the base having an interior flange, a bearing sleeve having a lateral flange and closed at the bottom, a yielding insulating ring interposed between the flange in the boss and the flange on the sleeve, a yielding insulating ring above said sleeve flange, a member for clamping said second ring, a rotatable drum within the casing having a shaft supported in said sleeve and means for conductively and flexibly connecting said sleeve and said casing.

WILLIAM FORGER.